(12) United States Patent
Kim et al.

(10) Patent No.: US 10,802,299 B2
(45) Date of Patent: *Oct. 13, 2020

(54) DISPLAY DEVICES CORRESPONDING TO THE SHAPE OF A NON-SQUARE OR NON-RECTANGULAR EFFECTIVE DISPLAY AREA AND A DRIVING METHOD THEREOF

(71) Applicant: Samsung Display Co., Ltd., Yongin-Si, Gyeonggi-Do (KR)

(72) Inventors: Hong Soo Kim, Yongin-si (KR); Jun Heyung Jung, Yongin-si (KR); Ja Kyoung Jin, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,972

(22) Filed: Aug. 19, 2019

(65) Prior Publication Data

US 2019/0369419 A1   Dec. 5, 2019

Related U.S. Application Data

(63) Continuation of application No. 16/149,720, filed on Oct. 2, 2018, now Pat. No. 10,386,658, which is a
(Continued)

(30) Foreign Application Priority Data

Aug. 11, 2016   (KR) .......................... 10-2016-0102284

(51) Int. Cl.
  *G11C 7/00*   (2006.01)
  *G02F 1/01*   (2006.01)
  (Continued)

(52) U.S. Cl.
  CPC ........ *G02F 1/0105* (2013.01); *G02F 1/13452* (2013.01); *G02F 1/29* (2013.01);
  (Continued)

(58) Field of Classification Search
  CPC ...... G02F 1/0105; G02F 1/13452; G02F 1/29; G09G 3/3241; G09G 3/3685
  (Continued)

(56) References Cited

U.S. PATENT DOCUMENTS 10,114,236 B2    10/2018 Kim et al.
10,256,257 B2 *   4/2019 French .............. G02F 1/136286
(Continued)

FOREIGN PATENT DOCUMENTS

CN    104732936 A    6/2015
EP      3051529 A1    8/2016
(Continued)

OTHER PUBLICATIONS

Partial European Search Report for 17185802.0, dated Nov. 6, 2017 (13 pages).
Extended European Search Report, Application No. 17185802.0, dated Jan. 8, 2016, pp. 1-13.

*Primary Examiner* — Connie C Yoha
(74) *Attorney, Agent, or Firm* — Innovation Counsel LLP (57) ABSTRACT

A display device includes: a display unit including scan lines, data lines, unit areas corresponding to intersections of the scan lines and the data lines, the unit areas including first unit areas in an effective display area, second unit areas in a dummy area around the effective display area, some of the second unit areas being smaller than the first unit areas, and pixels in the first unit areas; a timing controller configured to receive first data including image data corresponding to the first and second unit areas and to convert the first data into second data corresponding to the effective display area; and a data driver configured to generate a data signal corresponding to the second data. The display unit includes a first horizontal line having fewer pixels than the number of the data lines.

20 Claims, 8 Drawing Sheets

Related U.S. Application Data continuation of application No. 15/636,807, filed on Jun. 29, 2017, now Pat. No. 10,114,236.

(51) Int. Cl.
  *G09G 3/20* (2006.01)
  *G02F 1/1345* (2006.01)
  *G02F 1/29* (2006.01)
  *G09G 3/3241* (2016.01)
  *G09G 3/36* (2006.01)

(52) U.S. Cl.
  CPC ............. *G09G 3/20* (2013.01); *G09G 3/3241* (2013.01); *G09G 3/3685* (2013.01); *G09G 2300/0413* (2013.01); *G09G 2300/0426* (2013.01); *G09G 2310/0232* (2013.01); *G09G 2320/02* (2013.01); *G09G 2340/04* (2013.01)

(58) Field of Classification Search
  USPC .... 365/189.05, 63, 230.03; 345/98, 96, 214, 345/212, 204, 76, 211
  See application file for complete search history.

(56) References Cited

U.S. PATENT DOCUMENTS

| | | |
|---|---|---|
| 2008/0018557 A1 | 1/2008 | Maeda |
| 2009/0140956 A1 | 6/2009 | Choi |
| 2014/0253419 A1 | 9/2014 | Tanada |
| 2015/0302811 A1 | 10/2015 | Park |
| 2016/0005365 A1 | 1/2016 | Choi et al. |
| 2016/0055779 A1* | 2/2016 | Lee .......................... G09G 3/20 345/55 |
| 2016/0125844 A1* | 5/2016 | Lee ..................... G09G 3/3233 345/213 |
| 2016/0189601 A1 | 6/2016 | Jung et al. |
| 2016/0307534 A1 | 10/2016 | Wu |

FOREIGN PATENT DOCUMENTS

| | | |
|---|---|---|
| KR | 10-0158645 B1 | 2/1999 |
| KR | 10-2011-0066333 A | 6/2011 |
| KR | 10-2016-0047678 A | 5/2016 |

\* cited by examiner

| | | | | | | | | | | | |
|---|---|---|---|---|---|---|---|---|---|---|---|
| HP1 | Protocol | DSx | DSx | DS13 | DS14 | DS15 | DS16 | DS17 | DSx | DSx | Horizontal blank data |
| HP2 | Protocol | DSx | DS22 | DS23 | DS24 | DS25 | DS26 | DS27 | DS28 | DSx | Horizontal blank data |
| ⋮ | | | | | | | | | | | |
| HPN | Protocol | DSx | DSx | DSN3 | DSN4 | DSN5 | DSN6 | DSN7 | DSx | DSx | Horizontal blank data |

— # DISPLAY DEVICES CORRESPONDING TO THE SHAPE OF A NON-SQUARE OR NON-RECTANGULAR EFFECTIVE DISPLAY AREA AND A DRIVING METHOD THEREOF

RELATED APPLICATIONS

This application is a continuation application of U.S. patent application Ser. No. 16/149,720 filed on Oct. 2, 2018, which is a continuation application of U.S. patent application Ser. No. 15/636,807 filed on Jun. 29, 2017 (now U.S. Pat. No. 10,114,236), which claims priority to and the benefit of Korean Patent Application No. 10-2016-0102284 filed in the Korean Intellectual Property Office (KIPO) on Aug. 11, 2016, the contents of the prior applications being herein incorporated by reference.

BACKGROUND

1. Field

An aspect of the present disclosure relates generally to display devices, and more specifically to a display device and a driving method thereof.

2. Description of the Related Art

Recently, as the application scope of display devices has broadened, display devices have been more widely applied to various types of electronic devices. Accordingly, demand for display devices having various shapes has increased with the need to fit various types of electronic devices.

SUMMARY

Embodiments provide a display device and a driving method thereof, for the more effective display of images corresponding to the shape of a non-square or non-rectangular effective display area, thereby reducing power consumption.

According to an aspect of the present disclosure, there is provided a display device including: a display unit including scan lines, data lines, unit areas corresponding to intersections of the scan lines and the data lines, the unit areas including first unit areas in an effective display area, second unit areas in a dummy area around the effective display area, some of the second unit areas being smaller than the first unit areas, and pixels in the first unit areas; a timing controller configured to receive first data including image data corresponding to the first and second unit areas, the timing controller further configured to convert the first data into second data, corresponding to the effective display area, and to output the second data; and a data driver configured to generate a data signal that corresponds to the second data, and to supply the data signal to the data lines. The display unit includes a first horizontal line having fewer pixels than the number of the data lines. During a first horizontal period corresponding to the first horizontal line, the data signal that corresponds to the second data is applied to data lines connected to the pixels of the first horizontal line, and a predetermined first voltage is applied to the other data lines.

At least some of the scan lines and data lines, which are arranged in the dummy area, may have bent portions that extend in nonlinear manner to correspond to an edge of the effective display area.

The display unit may include a plurality of dummy areas positioned with the effective display area interposed therebetween.

The timing controller may include: a memory configured to store position information of the pixels; and a data converter configured to convert the first data into the second data with reference to the position information stored in the memory.

The data converter may generate second line data corresponding to each horizontal line by: extracting first line data corresponding to each horizontal line of the display unit from the first data, arranging the first line data in an order corresponding to the positions of the pixels of the each horizontal line, and arranging predetermined data at positions corresponding to second unit areas of the each horizontal line, the predetermined data corresponding to the first voltage.

The data converter may generate the second data by: extracting effective data corresponding to the first unit areas from the first data, arranging the effective data at data positions corresponding to the first unit areas, and arranging predetermined data at data positions corresponding to the second unit areas, the predetermined data corresponding to the first voltage.

The timing controller may transmit, to the data driver, channel information comprising, for each of the horizontal lines included in the display unit, a position at which the effective display area begins and a point at which the effective display area ends.

The display unit may further include a second horizontal line having a number of the pixels equal to the number of the data lines.

The display unit may include at least three horizontal lines each having a number of pixels different from those of each of the others of the at least three horizontal lines.

The first voltage may be a lowest voltage of gray level voltages generated by the data driver.

According to an aspect of the present disclosure, there is provided a display device including: a data driver including M (where M is a natural number greater than or equal to 2) channels connected to M data lines; and a display unit including a first horizontal line having I (where I is a natural number smaller than M) pixels. During a period in which a data signal corresponding to the first horizontal line is supplied to the data lines, the data driver is configured to output a data signal corresponding to an image through I channels corresponding to the I pixels, and is further configured to output a data signal having a predetermined first voltage through the remaining channels.

The first voltage may be a lowest voltage from among gray level voltages generated by the data driver.

The display unit may further include a second horizontal line having M pixels.

During a period in which a data signal corresponding to the second horizontal line is supplied to the data lines, the data driver may be further configured to output a data signal corresponding to the image through the M channels.

According to an aspect of the present disclosure, there is provided a method of driving a display device including a display unit having a plurality of scan lines, a plurality of data lines, and a first horizontal line on which are arranged a number of pixels that is smaller than the number of the data lines. The method includes: receiving first data including image data for every unit area that corresponds to an intersection of the scan lines and the data lines; extracting first line data corresponding to the first horizontal line from the first data; generating second line data corresponding to the first horizontal line by replacing, with predetermined data, all remaining first line data besides that corresponding to the pixels of the first horizontal line; outputting the second line data to a data driver; generating a data signal corresponding to the second line data; and driving the pixels of the first horizontal line by supplying the data signal to the data lines.

The predetermined data may be digital data corresponding to a predetermined first voltage.

The first voltage may be a lowest voltage from among gray level voltages of the display unit.

The method may further include, before the outputting, transmitting, to the data driver, position information of the effective display area corresponding to the first horizontal line.

The position information may include channel information corresponding to a point on the first horizontal line at which the effective display area begins, and to a point on the first horizontal line at which the effective display area ends.

According to an aspect of the present disclosure, there is provided a method for driving a display device including a display unit having scan lines, data lines, first unit areas in an effective display area and corresponding to intersections of the scan lines and the data lines, and second unit areas in a dummy area around the effective display area. The method includes: receiving first data including image data for all of the first and second unit areas; generating second data by reading effective data, the effective data being that first data corresponding to the first unit areas, and by replacing the remaining first data besides the effective data with predetermined data; generating, from the second data, line data corresponding to each horizontal line of the effective display area; and driving pixels on each horizontal line using the line data.

The predetermined data may be digital data corresponding to a predetermined first voltage.

The first voltage may be a lowest voltage from among gray level voltages of the display unit.

The method may further include transmitting position information of the effective display area to a data driver.

The position information of the effective display area may include channel information corresponding to a point at which the effective display area begins on each horizontal line, and channel information corresponding to a point at which the effective display area ends on each horizontal line.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. The various figures thus may not be to scale. It will be understood that when an element is referred to as being "between" two elements, it can be the only element between the two elements, or one or more intervening elements may also be present. Like reference numerals refer to like elements throughout.

DETAILED DESCRIPTION

Hereinafter, exemplary embodiments of the present disclosure will be described in detail with reference to the accompanying drawings. However, the present disclosure is not limited to the embodiments but may be implemented into different forms. These embodiments are provided only for illustrative purposes and for full understanding of the scope of the present disclosure by those skilled in the art.

Meanwhile, in the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings. All numerical values are approximate, and may vary. All examples of specific materials and compositions are to be taken as nonlimiting and exemplary only. Other suitable materials and compositions may be used instead.

Figure 1:
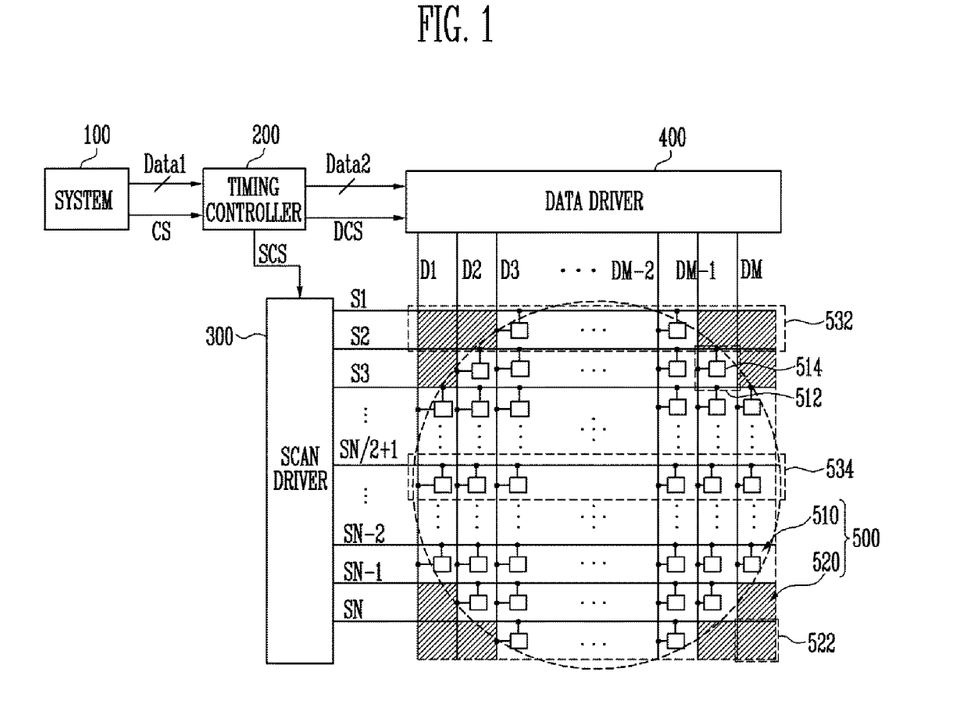
FIG. 1 illustrates an embodiment of a display device.

FIG. 1 illustrates an embodiment of a display device. In addition to actual lines, e.g., scan lines and data lines, dotted virtual lines are presented for purposes of illustration.

Referring to FIG. 1, the display device according to the embodiment of the present disclosure includes a system 100, a timing controller 200, a scan driver 300, a data driver 400, and a display unit 500. In some embodiments, the display unit 500 may be implemented as a display panel. The display unit 500 includes an effective display area 510 which may be implemented in various shapes. For example, the effective display area 510 may have a circular shape, an elliptical shape, etc. or a polygonal shape including a trapezoidal shape, a hexagonal shape, etc., or may have a shape including any combination of any of the above shapes. That is, in the embodiment of the present disclosure, the shape of the effective display area 510 is not particularly limited, and may be variously modified. Indeed, any shape is contemplated.

The system 100 may be a source unit that transmits various control signals CS for driving the display unit 500, and also transmits image data (hereinafter, referred to as "first data") Data1. For example, the system 100 may be a main body of a notebook computer including a graphic card, or an application processor of a mobile device. The control signals CS and the image data Data1 output from the system 100 are input to the timing controller 200.

The timing controller 200 generates a scan control signal SCS and a data control signal DCS in response to the control signals CS from the system 100, and transmits the scan control signal SCS and the data control signal DCS to the scan driver 300 and the data driver 400, respectively. Also, the timing controller 200 realigns the first data Data1 from the system 100 and transmits the first data Data1 to the data driver 400. Particularly, in this embodiment, the timing controller 200 generates a second data Data2 by converting the first data Data1 to correspond to the effective display area 510 in which an image is actually displayed, and transmits the second data Data2 to the data driver 400.

The scan driver 300 generates a scan signal in response to the scan control signal SCS supplied from the timing controller 200, and supplies the generated scan signal to scan lines S1 to SN. For example, the scan driver 300 may sequentially supply the scan signal to the scan lines S1 to SN in response to the scan control signal SCS. When the scan signal is supplied to the scan lines S1 to SN, pixels 514 arranged in the effective display area are selected in units of horizontal lines.

In some embodiments, the scan driver 300 may be implemented as a built-in circuit directly formed together with transistors (not shown) provided in the pixels 514 on the display panel, or may be mounted in the form of a semiconductor chip on the display panel or a circuit board connected thereto. When the scan driver 300 is implemented as a built-in circuit on the display panel, manufacturing cost may be reduced. Meanwhile, when the scan driver 300 is mounted in the form of the semiconductor chip, various programming may be performed, and thus the driving method of the scan driver 300 may be diversified.

The data driver 400 generates a data signal using the data control signal DCS and the second data Data2, which are supplied from the timing controller 200, and supplies the generated data signal to data lines D1 to DM to be synchronized with the scan signal. The data signal supplied to the data lines D1 to DM is supplied to pixels 514 selected by the scan signal.

In some embodiments, the data driver 400 may be individually mounted, for example, in the form of a semiconductor chip on the display panel or a circuit board connected thereto. Alternatively, in some embodiments, the data driver 400 may be integrated with other driving circuits including the scan driver 300.

The display unit 500 includes a plurality of scan lines S1 to SN, a plurality of data lines D1 to DM, and a plurality of unit areas 512 and 522 corresponding to intersections of the scan lines S1 to SN and the data lines D1 to DM. For example, the display unit 500 may include N (N is a natural number of 2 or more) scan lines S1 to SN, M (M is a natural number of 2 or more) data lines D1 to DM, and a plurality of unit areas 512 and 522 arranged in the form of an N*M matrix corresponding to intersections of the N scan lines S1 to SN and the M data lines D1 to DM. Each of the unit areas 512 and 522 may be arranged at a position corresponding to the coordinates defined by a corresponding scan line and a corresponding data line. In some embodiments, the number of scan lines S1 to SN and the number of data lines D1 to DM arranged in the display unit 500 is not particularly limited, and each may vary.

The display unit 500 includes the effective display area 510 and a dummy area 520. In some embodiments, the effective display area 510 may be configured with first unit areas 512 in which the respective pixels 514 are arranged, and the dummy area 520 may be configured with second unit areas 522 arranged at peripheral portions (e.g., outer portions) of the effective display area 510.

When a scan signal is supplied from the scan lines S1 to SN, each of the pixels 514 receives a data signal from the data lines D1 to DM, and emits light with a luminance corresponding to the data signal. In some embodiments, the pixels 514 may be implemented as pixels of an organic light emitting display device, or may be implemented as pixels of a liquid crystal display device. However, in the embodiment of the present disclosure, the type of the pixels 514 is not particularly limited.

In some embodiments, the pixels 514 are not present in the second unit areas 522. That is, the dummy area 520 may be a non-effective display area in which no image is displayed.

In some embodiments, the display unit 500 may include at least two horizontal lines having different numbers of pixels 514. For example, the display unit 500 may include a first horizontal line 532 on which I (I is a natural number smaller than M) pixels 514 are arranged, and a second horizontal line 534 on which M pixels 514 are arranged. Here, the first horizontal line 532 does not necessarily refer to only a first row of the display unit 500. For example, the first horizontal line 532 may refer to an arbitrary horizontal line having a number of pixels smaller than the number of the data lines D1 to DM. Similarly, the second horizontal line 534 may refer to an arbitrary horizontal line on which M pixels 514 are arranged, i.e., an arbitrary horizontal line on which a maximum number of pixels 514 is arranged.

In some embodiments, the display unit 500 may include at least three horizontal lines including pixels having numbers different from one another. For example, the number of pixels 514 included in each of the horizontal lines 532 and 534 may increase or decrease with distance from one end of the display unit 500.

That is, in an embodiment of the present disclosure, the number of pixels 514 arranged in the effective display area 510 may vary depending on the shape of the effective display area 510.

In the display device described above, the display unit 500 includes fewer pixels 514 than the total number of intersections of the scan lines S1 to SN and the data lines D1 to DM. In the display device, the timing controller 200 receives first data Data1 including image data corresponding to the respective unit areas 512 and 522. That is, the system 100 generates frame data (first data Data1) including image data corresponding to all the respective unit areas 512 and 522 defined by the scan lines S1 to SN and the data lines D1 to DM, regardless of the shape of the effective display area 510 and/or the number and arrangement structure of actual pixels 514, and transmits this frame data to the timing controller 200.

In some embodiments, the timing controller 200 converts first data Data1 into second data Data2, corresponding to the number of pixels 514 arranged on each horizontal line of the display unit 500, and outputs the second data Data2 to the data driver 400. For example, when the timing controller 200 generates line data for one horizontal line, the timing controller 200 may arrange image data corresponding to each of first unit areas 512 in which actual pixels 514 are arranged. Also, the timing controller 200 may omit signal processing for image data corresponding to each of second unit areas 522 of the dummy area 520, and collectively replace the image data of the second unit areas 522 with predetermined specific data, thereby arranging the predetermined specific data at a data position (sequence) corresponding to the corresponding second unit area 522. Through above-described process, the timing controller 200 generates second data Data2 including the respective line data, and outputs the second data Data2 to the data driver 400.

That is, the timing controller 200 extracts only effective data corresponding to the effective display area 510 from input data (i.e., first data Data1) meant for display on a quadrangular matrix, and transmits the effective data to the data driver 400. In addition, the timing controller 200 omits signal processing for dummy data corresponding to the dummy area 520 and collectively arranges specific data at positions of the dummy data, thereby transmitting the specific data to the data driver 400. Accordingly, the timing controller 200 may reduce power consumption. Further, line data corresponding to the number of channels of the data driver 400 for each horizontal line is supplied to the data driver 400, so that the data driver 400 may be normally driven.

The data driver 400 receiving second data Data2 generates a data signal corresponding to the second data Data2, and outputs the generated data signal to the data lines D1 to DM. In some embodiments, according to the actual positions of the pixels 514, the data driver 400 receives effective data corresponding to a gray level to be displayed in a corresponding pixel 514 of the first unit areas 512, and collectively receives specific data with respect to the second unit areas 522 of the dummy area 520.

Accordingly, the data driver 400 supplies a data signal of a corresponding pixel 514 (e.g., a gray level voltage generated corresponding to gray level data of the corresponding pixel 514) to data lines connected to the pixels 514. In addition, the data driver 400 supplies a predetermined first voltage to the other data lines that are not connected to pixels 514 on the corresponding horizontal line, corresponding to specific data from the timing controller 200.

In some embodiments, the first voltage may be the lowest gray level voltage (e.g., black or white gray level voltage) generated by the data driver 400. In this case, the power consumption of the data driver 400 may be reduced.

As described above, according to the embodiment of the present disclosure, in driving of a display device with an effective display area 510 different from a standardized shape such as a rectangle or square, data may be transmitted corresponding to the shape of the effective display area 510. Accordingly, power consumed in a driving circuit including the timing controller 200 and/or the data driver 400 is reduced, so that the power consumption of the display device may be effectively reduced.

Figure 2A:
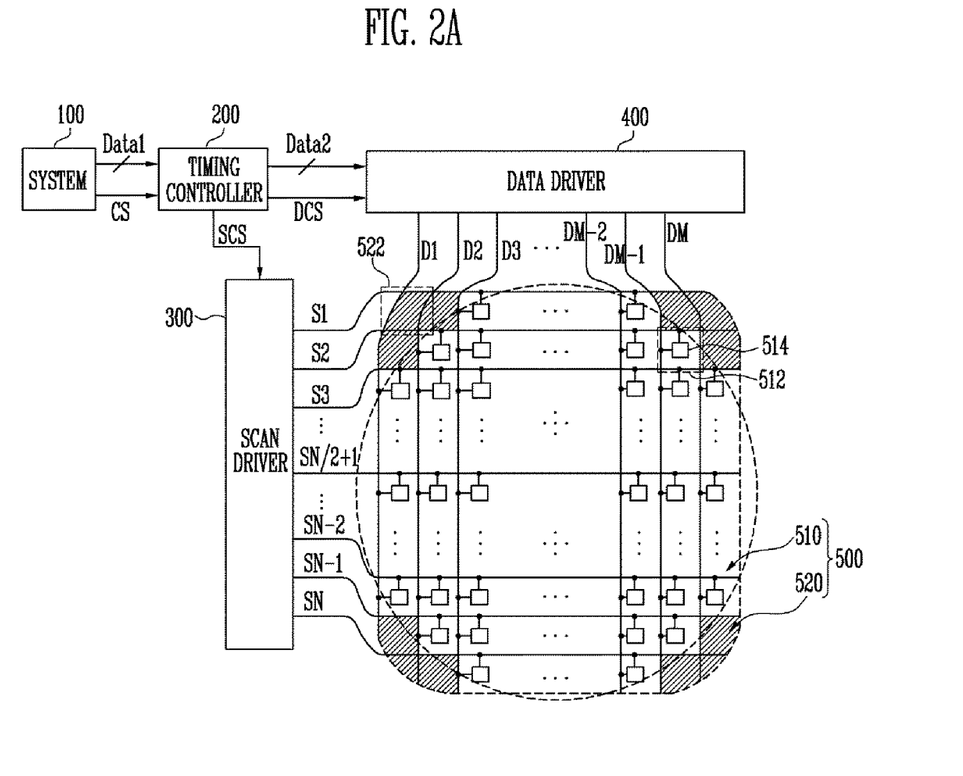
FIGS. 2A and 2B illustrate other embodiments of a display device.
Figure 2B:
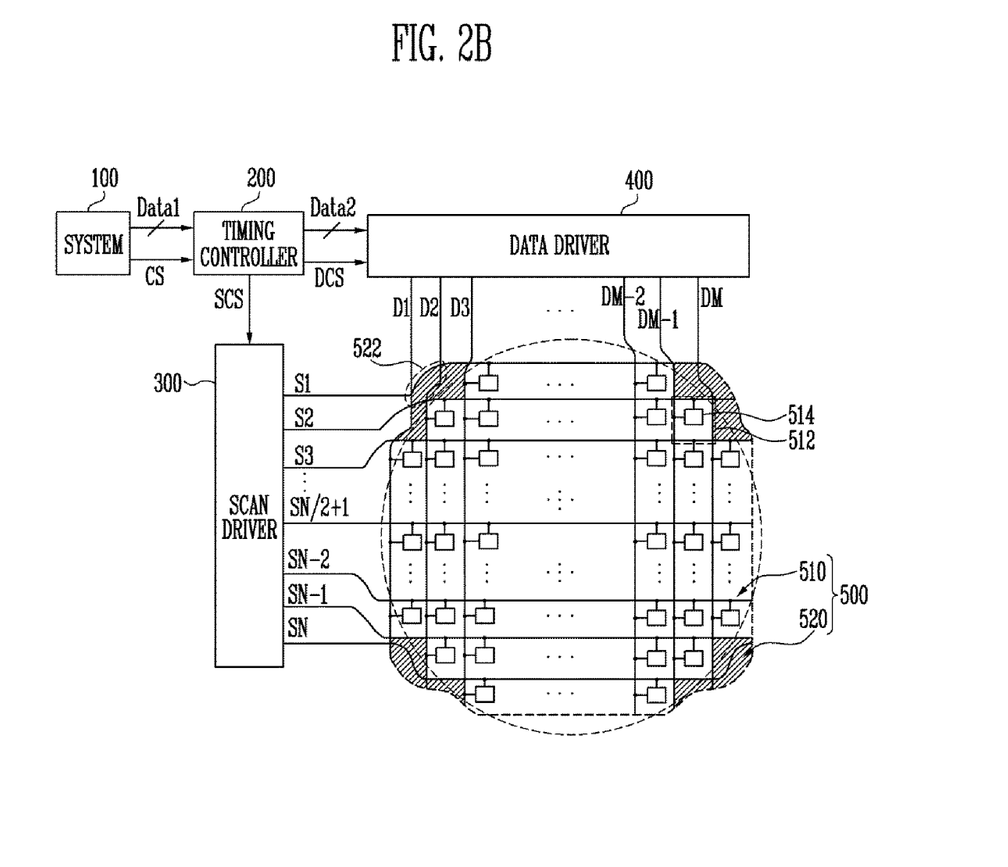

FIGS. 2A and 2B illustrate other embodiments of a display device. In FIGS. 2A and 2B, components identical or similar to those of FIG. 1 are designated by like reference numerals, and their detailed descriptions will be omitted.

Referring to FIGS. 2A and 2B, in some embodiments, at least some of the scan lines S1 to SN and the data lines D1 to DN may have bending or bent portions corresponding to the shape of an effective display area 510. Here, the bending portions may inclusively mean any nonlinear portions, such as curved or rounded portions.

For example, when the effective display area 510 has a circular shape, and a display unit 500 is a circular display panel corresponding to the shape of the effective display area 510, at least some of the scan lines S1 to SN and the data lines D1 to DM may be formed such that at least one area of each line has a bending portion that is curved according to the shape of the display unit 500.

In some embodiments, at least some of the scan lines S1 to SN and the data lines D1 to DM may be more densely arranged at least in a dummy region 520. In this case, each of at least some of the second unit areas 522 may have areas smaller than those of first unit areas 512.

For example, as shown in FIG. 2A, each of the second unit areas 522 may have a smaller area than each of the first unit areas 512. In this case, the individual areas of the second unit areas 522 may decrease with distance from the effective display area 510. However, the present disclosure is not limited thereto, and the shape or arrangement density of the scan lines S1 to SN and the data lines D1 to DM may be variously modified.

In some embodiments, as shown in FIG. 2B, the scan lines S1 to SN and the data lines D1 to DM may be arranged with their nonlinear portions positioned close to the effective display area 510 so as to be more densely arranged near the display area 510. For example, at least some of the scan lines S1 to SN and the data lines D1 to DM, may be densely arranged in the dummy area 520 near the effective display area 510, while being bent corresponding to (i.e. curved to extend conformally along the outer edge of) the outline of the effective display area 510. In this case, the area of each of the second unit areas 522 is minimized, thereby more effectively reducing dead spaces. The shape, etc. of the second unit areas 522 is not particularly limited, and may be variously modified.

In addition, according to the shapes of the display unit 500 and the effective display area 510, at least some of the scan lines S1 to SN and the data lines D1 to DM may have bending portions even in the effective display area 510.

According to the above-described embodiment, the scan lines S1 to SN and the data lines D1 to DM are routed to correspond to the shapes of the display unit 500 and the effective display area 510, thereby reducing dead spaces.

Figure 3A:
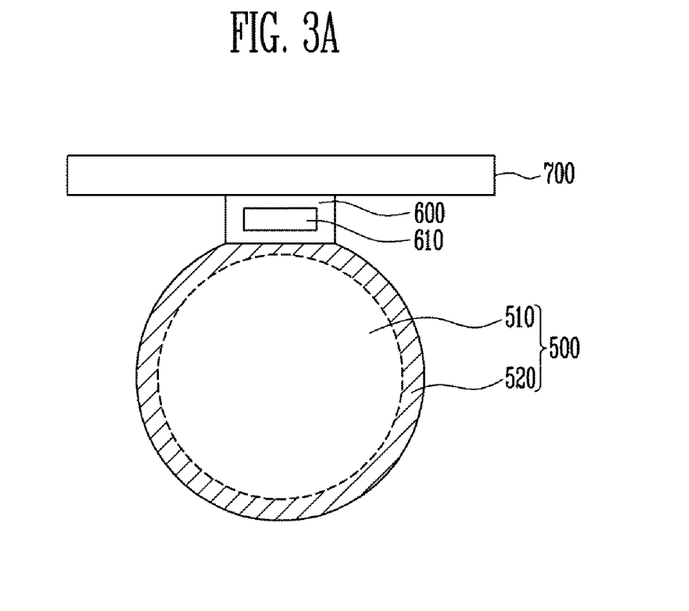
FIGS. 3A to 3C schematically illustrate embodiments of a display unit and a driving circuit connected thereto.
Figure 3B:
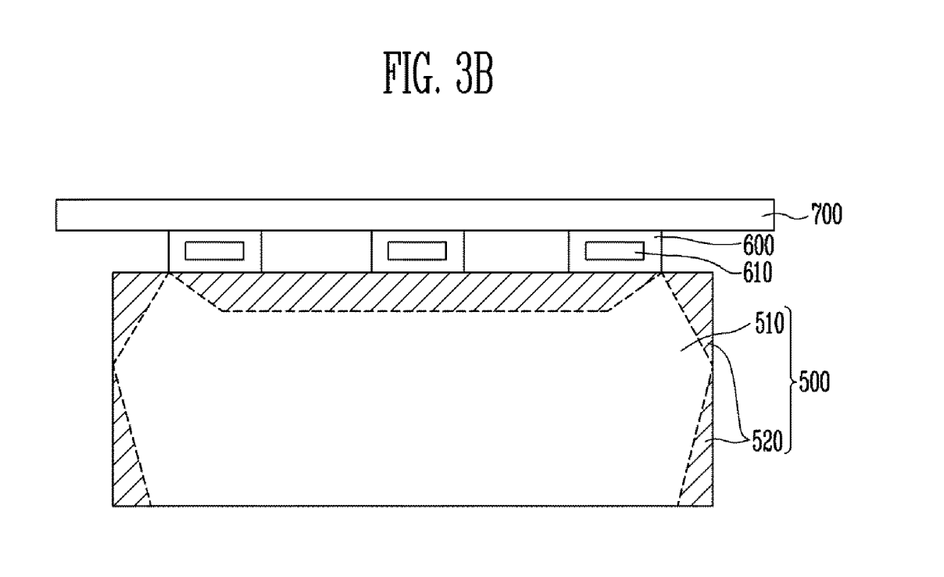
Figure 3C:
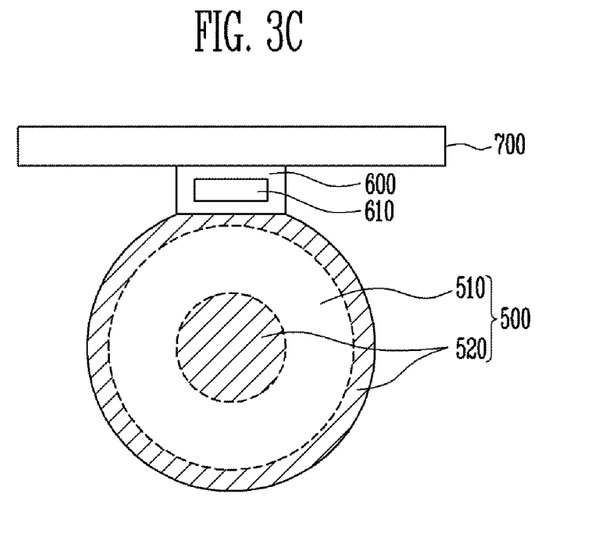

FIGS. 3A to 3C schematically illustrate embodiments of the display unit and the driving circuit connected thereto. In the embodiments shown in FIGS. 3A to 3C, the display unit may be a display panel.

Referring to FIGS. 3A to 3C, the shapes of the display unit 500 and/or the effective display area 510 may be variously modified. For example, as shown in FIG. 3A, the display unit 500 and the effective display area 510 may both have circular shapes. In some embodiments, as shown in FIG. 3B, the display unit 500 and the effective display area 510 may have shapes different from each other. In some embodiments, at least one of the effective display area 510 and a dummy area 520 may be divided into plural areas in the display unit 500. For example, as shown in FIG. 3C, the display unit 500 may include a plurality of dummy areas 520 separated by an effective display area 510 interposed therebetween.

Thus, in the embodiments of the present disclosure, the shapes of the display unit 500, the effective display area 510, and the dummy area 520 are not particularly limited, and may be freely modified. Accordingly, the display devices according to the embodiment of the present disclosure may be applied to not only mobile phones, televisions, monitors, and the like but also various types of information display devices such as electronic watches and dashboards.

Meanwhile, in some embodiments, at least one of the timing controller 200, the scan driver 300, and the data driver 400, which are described above, may be formed together with the pixels 514 in the display unit 500, or may be mounted in the form of a semiconductor chip on the display unit 500. Alternatively, in some embodiments, at least one of the timing controller 200, the scan driver 300, and the data driver 400 may be mounted on a first circuit board 600 and integrated in the form of a semiconductor chip 610 to be connected to the display unit 500. In some embodiments, the first circuit board 600 may be a flexible circuit board electrically connected to the display unit 500. In some embodiments, the display unit 500 and/or the first circuit board 600 may be electrically connected to the system 100 through a second circuit board 700, thereby communicating with the system 100.

Figure 4:
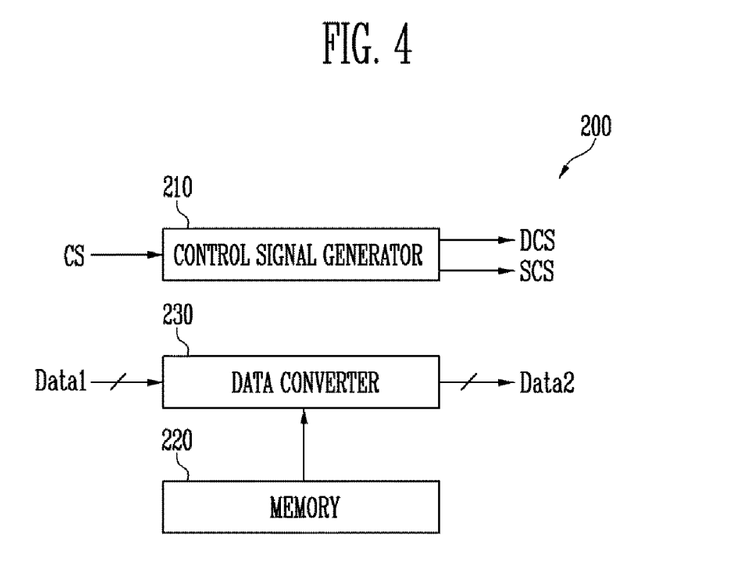
FIG. 4 illustrates an embodiment of a timing controller.
Figure 5A:
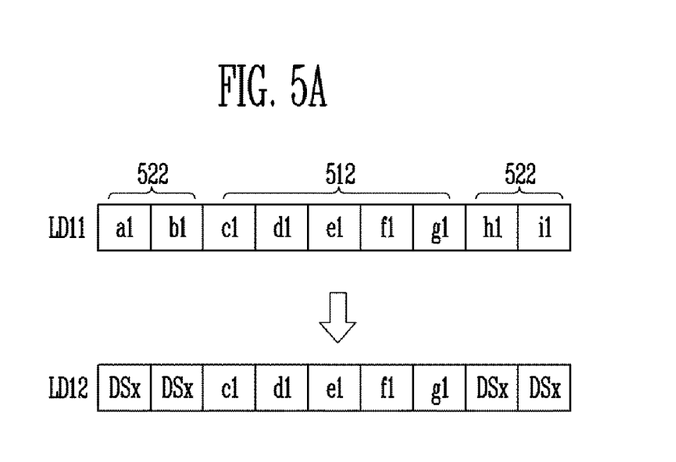
FIGS. 5A and 5B illustrate an embodiment of a data conversion method of the timing controller.
Figure 5B:
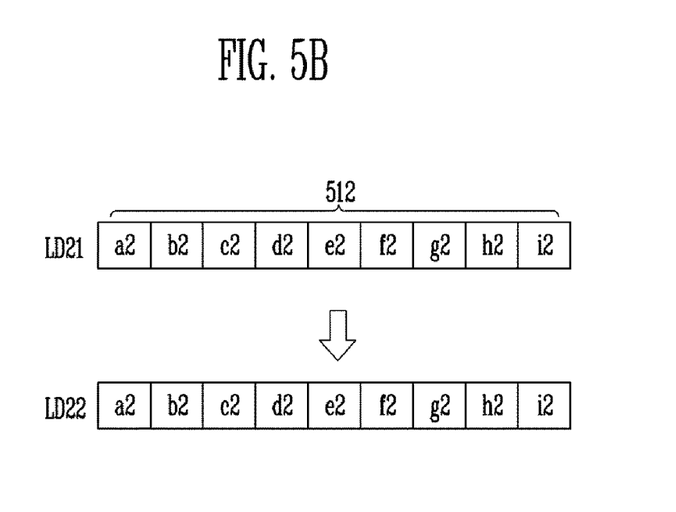

FIG. 4 illustrates an embodiment of the timing controller. FIGS. 5A and 5B illustrate an embodiment of a data conversion method of the timing controller. For convenience, a method for converting line data for one horizontal line has been illustrated in FIGS. 5A and 5B, but the present disclosure is not limited thereto. For example, the timing controller may convert data in units of frame data for one frame.

Referring to FIG. 4, the timing controller 200 according to the embodiment of the present disclosure includes a control signal generator 210, a memory 220, and a data converter 230.

The control signal generator 210 generates a scan control signal SCS and a data control signal DCS in response to various control signals CS from the system 100, and outputs the scan control signal SCS and the data control signal DCS to the scan driver 300 and the data driver 400, respectively. In some embodiments, the control signals CS may include a horizontal synchronization signal and a vertical synchronization signal. In some embodiments, the scan control signal SCS may include a gate start pulse and a gate shift clock. In some embodiments, the data control signal DCS may include a source start pulse, a source shift clock, and a source output enable signal.

The memory 220 stores information on the effective display area 510. For example, the memory 220 may store position information of the pixels 514 arranged in the effective display area 510.

In FIG. 4, the memory 220 is configured inside the timing controller 200, but the position of the memory 220 is not particularly limited. For example, the memory 220 may be provided anywhere outside of the timing controller 200.

The data converter 230 generates second data Data2 by converting first data Data1 from the system 100 to correspond to the effective display area 510, and outputs the generated second data Data2 to the data driver 400. To this end, the data converter 230 may convert the first data Data1 into the second data Data2 with reference to information on the shape of effective display area 510 stored in the memory 220. In addition, the data converter 230 may include at least one frame memory (not shown) and/or at least one line memory (not shown) to store the first data Data1 and the second data Data2.

In some embodiments, the data converter 230 may extract, from the first data Data1, first line data corresponding to each horizontal line of the display unit 500. After that, the data converter 230 arranges the first line data to correspond to each of the pixels 514 arranged in the effective display area 510. Also, the data converter 230 converts data corresponding to each of the second unit areas 522 arranged in the dummy area 520 into gray level data (e.g., digital gray level data) corresponding to a preset specific voltage (e.g., a first voltage), and arranges the gray level data at data positions corresponding to the corresponding second unit areas 522, thereby generating a second line data. That is, the second line data may be data obtained by converting the first line data of each horizontal line according to the number of pixels 514 arranged on the corresponding horizontal line and the position thereof.

For example, when assuming that a total of nine unit areas 512 and 522 are provided on the first horizontal line 532, two unit areas at each of the left and right sides are second unit areas 522, and the other unit areas are first unit areas 512. The data converter 230 may convert first line data LD11 corresponding to the first horizontal line 532 into second line data LD12 as shown in FIG. 5A. That is, the data converter 230 may dispose predetermined data DSx at positions of data a1, b1, h1, and i1 corresponding to the second unit areas 522 regardless of values of the corresponding data a1, b1, h1, and i1, and align data c1, d1, e1, f1, and g1 corresponding to the first unit areas 512 at corresponding data positions, thereby generating the second line data LD12.

In some embodiments, the first line data LD11 and the second line data LD12 may be digital data. For example, the data c1, d1, e1, f1, and g1 (i.e., pixel data) corresponding to the first unit areas 512 and the predetermined data DSx corresponding to the second unit areas 522 may all be digital data having digital values.

Meanwhile, the data converter 230, as shown in FIG. 5B, may omit a process of replacing some data with the predetermined data DSx for lines having no second unit areas 522. For lines having as many pixels 514 as the number of the data lines D1 to DM, the data converter 230 aligns first line data LD21 including data a2, b2, c2, d2, e2, f2, g2, h2, and i2 corresponding to the first unit areas 512, at positions of the corresponding data a2, b2, c2, d2, e2, f2, g2, h2, and i2, thereby generating second line data LD22. The data converter 230 sequentially transmits, to the data driver 400, the second line data LD12 or LD22 corresponding to each horizontal line. For example, the data converter 230 may transmit, to the data driver 400, the second line data LD12 or LD22 for every data transmission period corresponding to the corresponding horizontal period.

From the viewpoint of driving of one frame, the data converter 230 may generate second data Data2 for one frame from first data Data1 for one frame. For example, the data converter 230 may extract effective data corresponding to the first unit areas 512 from the first data Data1 for one frame, and then arrange the effective data at data positions corresponding to the respective pixels 514 of the first unit areas 512, and arrange predetermined data DSx corresponding to the first voltage at data positions corresponding to the second unit areas 522, thereby generating the second data Data2 for one frame. The second data Data2 for one frame, generated by the data converter 230, is transmitted to the data driver 400. Then, the data driver 400 generates a data signal for the pixels 514 arranged on each horizontal line using the second line data, e.g. LD12 or LD22, for each horizontal line. The generated data signal is output to the data lines D1 to Dm during the corresponding horizontal period.

Figure 6:
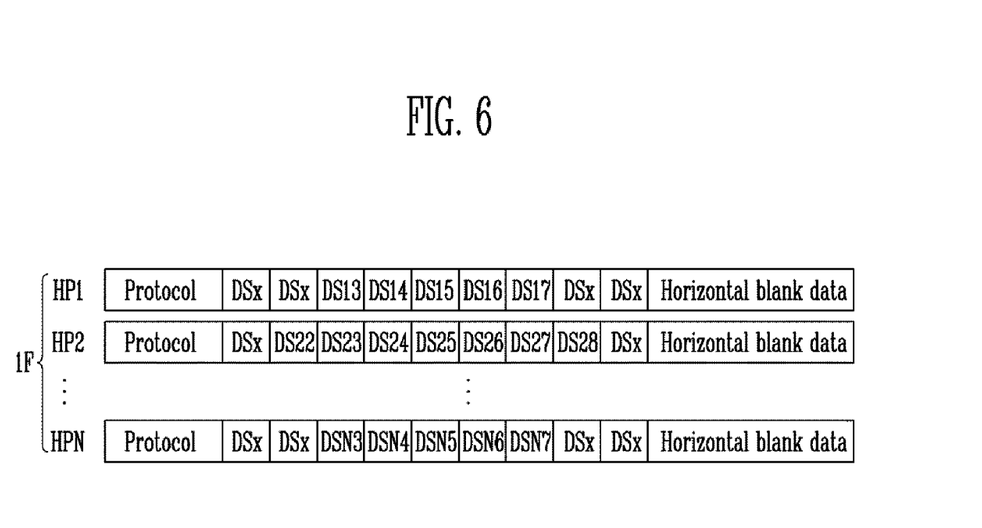
FIG. 6 illustrates an embodiment of a driving signal for one frame, transmitted from the timing controller to a data driver.
Figure 7:
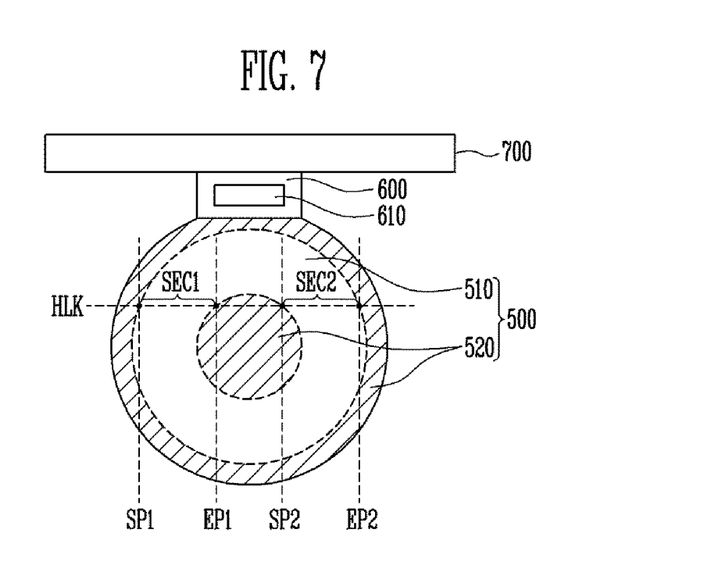
FIG. 7 illustrates an embodiment of a method for transmitting channel information on an effective display area.

FIG. 6 illustrates an embodiment of a driving signal for one frame, transmitted from the timing controller to the data driver. FIG. 7 illustrates an embodiment of a method for transmitting channel information on the effective display area.

Referring to FIG. 6, for signal transmission periods HP1 to HPN for driving each horizontal line during one frame 1F, the timing controller 200 transmits, to the data driver 400, protocol and second data Data2 for driving the corresponding horizontal line. In some embodiments, second line data of each horizontal line included in the second data Data2 may be sequentially output during one frame 1F. In some embodiments, the second line data of each horizontal line may include effective data DS13 to DSN7 on pixels 514 of the corresponding horizontal line, and/or predetermined specific data DSx on second unit areas 522 of the corresponding horizontal line. In some embodiments, a horizontal blank period, in which horizontal blank data is transmitted, may be disposed just after the second line data of each horizontal line is applied.

Meanwhile, in some embodiments, the timing controller 200 may allow information on an effective display area 510 of the corresponding horizontal line to be included in the protocol, and transmit the protocol to the data driver 400.

For example, for each horizontal line, the timing controller 200 may transmit, to the data driver 400, channel information corresponding to the point on the corresponding horizontal line at which the effective display area 510 begins, and channel information corresponding to the point on the corresponding horizontal line at which the effective display area 510 ends. The data driver 400, having received information on the effective display area 510, may use the information to implement various functions. That is, the information on the effective display area 510 is transmitted to the data driver 400, so that the function of the data driver 400 may be diversified.

In some embodiments, when a horizontal line of the effective display area 510 is divided into a plurality of sections, the timing controller 200 may transmit, to the data driver 400, channel information corresponding to start and end points of each section. For example, when the effective display area 510 is divided into first and second sections SEC1 and SEC2 on Kth (K is a natural number of N or less) horizontal line HLK as shown in FIG. 7, the timing controller 200 may allow first start channel information, first end channel information, second start channel information, and second end channel information to be included in the protocol, and transmit the protocol to the data driver 400. Here, the first start channel information corresponds to a start point SP1 of the first section SEC1, the first end channel information corresponds to an end point EP1 of the first section SEC1, the second start channel information corresponds to a start point SP2 of the second section SEC2, and the second end channel information corresponds to an end point EP2 of the second section SEC2.

Figure 8:
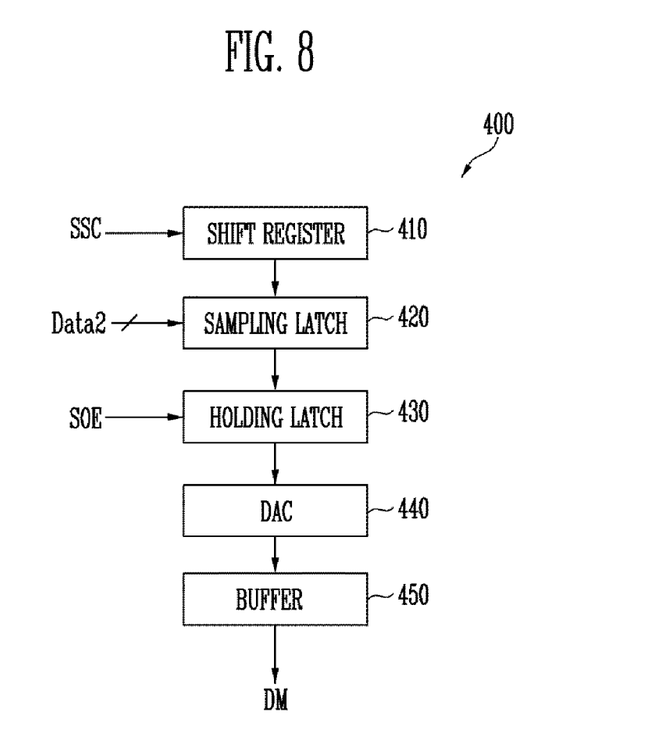
FIG. 8 illustrates an embodiment of the data driver.

FIG. 8 illustrates an embodiment of the data driver. For convenience, an Mth data driver channel connected to an Mth data line is illustrated in FIG. 8. That is, the data driver may include M channels corresponding to the number of data lines, and one channel of the M channels is illustrated in FIG. 8.

Referring to FIG. 8, the data driver 400 according to the embodiment of the present disclosure may include a shift register 410, a sampling latch 420, a holding latch 430, a digital-to-analog converter (hereinafter, referred to as a "DAC") 440, and a buffer 450, which are provided in each channel.

The shift register 410 supplies a sampling signal to the sampling latch 420. For example, a plurality of shift registers 410 provided in the data driver 400 may sequentially output M sampling signals while shifting a source start pulse (not shown) for every one period of a source shift clock SSC.

The sampling latch 420 stores second data Data2 (e.g., image data of a corresponding pixel 514, included in the second data Data2) supplied from the timing controller 200 in response to the sampling signal. For example, the sampling latch 420 may sequentially receive image data corresponding to pixels 514 of each horizontal line connected to the corresponding channel, and store the image data. The second data Data2 corresponds to an image to be displayed on the display unit 500. Particularly, the second data Data2 may be image data converted to correspond to the effective display area 510.

The holding latch 430 receives the second data Data2 stored in the sampling latch 420 in response to a source output enable SOE signal. The holding latch 430 stores the received second data Data2.

The DAC 440 generates an analog data signal corresponding to the second data Data2 supplied from the holding latch 430. For example, the DAC 440 may convert the second data Data2 into an analog gray level voltage such that a gray level corresponding to the bit value of the digital second data Data2 supplied to the holding latch 430 may be implemented. To this end, the DAC 440 may be connected to a gamma driver (not shown).

The buffer 450 supplies the data signal supplied from the DAC 440 to a data line DM connected to the corresponding channel.

According to the above-described operation, the data driver 400 supplies, to the data lines D1 to DM, a data signal corresponding to the second data Data2.

In some embodiments, during the above-described period in which a data signal corresponding to the first horizontal line 532 is supplied to the data lines D1 to DM, the data driver 400 outputs a data signal corresponding to an image to be actually displayed on the display unit 500 through I channels corresponding to I pixels 514 connected to the first horizontal line 532. The data driver 400 simultaneously outputs a data signal having a predetermined first voltage through the other one or more channels that are not connected to the pixels 514 of the first horizontal line 532. Meanwhile, during a period in which a data signal corresponding to the second horizontal line 534 (having M pixels 514) is supplied to the data lines D1 to DM, the data driver 400 outputs a data signal through all M channels.

As described in FIGS. 1 to 8, each of the display devices according to the embodiments of the present disclosure includes a number of pixels 514 that is smaller than the total number of unit areas 512 and 522 corresponding to the intersections of the scan lines S1 to SN and the data lines D1 to DM. That is, the unit areas 512 and 522 corresponding to the intersections of the scan lines S1 to SN and the data lines D1 to DM may be configured with first unit areas 512 arranged in the effective display area 510, and second unit areas 522 arranged in the dummy area 520 around the effective display area 510. In this case, the display unit 500 may include at least one horizontal line (e.g., a first horizontal line 532) on which the number of pixels 514 is smaller than the number of data lines D1 to DM.

From the viewpoint of driving of each horizontal line, e.g., the first horizontal line 532, a method of driving the display device according to embodiments of the present disclosure includes a step of receiving, from the system 100, first data Data1 including image data of the respective unit areas 512 and 522 corresponding to all intersections of the scan lines S1 to SN and the data lines D1 to DM, a step of extracting first line data LD11 corresponding to the first horizontal line 532 from the first data Data1, a step of generating second line data LD12 by replacing, with predetermined data DSx, the data corresponding to second unit areas 522, a step of outputting the second line data LD12 to the data driver 400, a step of generating a data signal corresponding to the second line data LD12, and a step of driving the pixels 514 of the first horizontal line 532 by supplying the generated data signal to the data lines D1 to DM.

In some embodiments, in the step of generating the second line data LD12, the data corresponding to second unit areas 522 may be collectively replaced with digital data DSx corresponding to a predetermined first voltage.

From the viewpoint of driving of one frame for implementing one screen, a method of driving the display device according to the embodiment of the present disclosure includes a step of receiving, from the system 100, first data Data1 for one frame, including image data of all of the first and second unit areas 512 and 522 corresponding to the intersections of the scan lines S1 to SN and the data lines D1 to DM, a step of reading effective data (data to be used to display an actual image) corresponding to the first unit areas 512 among the first data Data1, and generating second data Data2 by replacing the other data besides the effective data with predetermined data DSx, a step of generating line data LD12 or LD22 corresponding to each horizontal line of the effective display area 510 from the second data Data2, and a step of driving pixels 514 arranged on each horizontal line using the line data LD12 or LD22.

In some embodiments, in the step of generating the second data Data2, the other data besides the effective data may be collectively replaced with digital data DSx corresponding to a predetermined first voltage. In some embodiments, an operation of converting first data Data1 for one frame into second data Data2 for that frame may be performed inside the timing controller 200, e.g., the data converter 230.

In some embodiments, the second data Data2 for one frame may be transmitted to the data driver 400. Then, the data driver 400 may sort each line data LD12 or LD22 and generate a corresponding data signal for each horizontal line. The data signals generated by the data driver 400 may be output to the data lines D1 to DM during the corresponding horizontal period.

In a display device and driving method thereof according to the embodiments of the present disclosure, data may be more efficiently transmitted corresponding to the effective display area 510. Accordingly, the power consumption of the display device may be effectively reduced.

In some embodiments, the timing controller 200 may transmit, to the data driver 400, position information of the effective display area 510 corresponding to the first horizontal line 532 before the timing controller 200 transmits, to the data driver 400, the second line data LD12 corresponding to the first horizontal line 532. Meanwhile, from the viewpoint of driving of one frame, the timing controller 200 may transmit the position information of the effective display area 510 to the data driver 400 before the timing controller 200 transmits the second data Data2 for one frame to the data driver 400. In some embodiments, the position information of the effective display area 510 may include channel information corresponding to the points at which the effective display area 510 begins and ends on each horizontal line. The position information of the effective display area 510, transmitted to the data driver 400 may be used, for example, to diversify the function of data driver 400.

In a display device and driving method thereof according to the present disclosure, data is efficiently transmitted corresponding to the shape of the effective display area 510, thereby reducing power consumed by the driving circuit.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims. Various features of the above described and other embodiments can be mixed and matched in any manner, to produce further embodiments consistent with the invention.

What is claimed is:

1. A display device comprising:
a display unit including:
scan lines,
data lines,
unit areas including first unit areas in an effective display area having a non-rectangular shape and second unit areas in a dummy area around the effective display area, and
pixels in the first unit areas;
a timing controller configured to receive first data including image data corresponding to the first and second unit areas, the timing controller further configured to convert the first data into second data corresponding to the effective display area, and to output the second data; and
a data driver configured to generate a data signal that corresponds to the second data, and to supply the data signal to the data lines,
wherein the display unit includes a first horizontal line having fewer pixels than the data lines, and
wherein, during a first horizontal period corresponding to the first horizontal line, the data signal that corresponds to the second data is applied to data lines connected to the pixels of the first horizontal line, and a predetermined first voltage is applied to the other data lines.

2. The display device of claim 1, wherein at least some of the scan lines and the data lines, which are arranged in the dummy area, have bent portions that extend in nonlinear manner to correspond to an edge of the effective display area.

3. The display device of claim 2, wherein at least one of the second unit areas is smaller than each of the first unit areas.

4. The display device of claim 1, wherein the display unit includes a plurality of dummy areas positioned with the effective display area interposed therebetween.

5. The display device of claim 1, wherein the timing controller includes:
a memory configured to store position information of the pixels; and
a data converter configured to convert the first data into the second data with reference to the position information stored in the memory.

6. The display device of claim 5, wherein the data converter is further configured to generate second line data corresponding to each horizontal line by:
extracting first line data corresponding to each horizontal line of the display unit from the first data,
arranging the first line data in an order corresponding to the positions of the pixels of the each horizontal line, and
arranging predetermined data at positions corresponding to second unit areas of the each horizontal line, the predetermined data corresponding to the first voltage.

7. The display device of claim 5, wherein the data converter is further configured to generate the second data by:
extracting effective data corresponding to the first unit areas from the first data,
arranging the effective data at data positions corresponding to the first unit areas, and
arranging predetermined data at data positions corresponding to the second unit areas, the predetermined data corresponding to the first voltage.

8. The display device of claim 1, wherein the timing controller is further configured to transmit, to the data driver, channel information comprising, for each of the horizontal lines included in the display unit, a position at which the effective display area begins and a point at which the effective display area ends.

9. The display device of claim 1, wherein the display unit further includes a second horizontal line having a number of pixels equal to a number of data lines.

10. The display device of claim 9, wherein the display unit includes at least three horizontal lines each having a number of pixels different from that of each of the others of the at least three horizontal lines.

11. The display device of claim 1, wherein the first voltage is a lowest voltage of gray level voltages generated by the data driver.

12. A method of driving a display device including a display unit having an effective display area having a non-rectangular shape and a first horizontal line on which are arranged a number of pixels that is smaller than a number of data lines, the method comprising:
   receiving first data including image data for every unit area in the effective display area and in a dummy area around the effective display area;
   extracting first line data corresponding to the first horizontal line from the first data;
   generating second line data corresponding to the first horizontal line by replacing, with predetermined data, all remaining first line data besides that corresponding to the pixels of the first horizontal line;
   outputting the second line data to a data driver;
   generating a data signal corresponding to the second line data; and
   driving the pixels of the first horizontal line by supplying the data signal to the data lines.

13. The method of claim 12, wherein the predetermined data is digital data corresponding to a predetermined first voltage.

14. The method of claim 13, wherein the first voltage is a lowest voltage from among gray level voltages of the display unit.

15. The method of claim 12, further comprising, before the outputting, transmitting, to the data driver, position information of the effective display area corresponding to the first horizontal line.

16. The method of claim 15, wherein the position information includes channel information corresponding to a point on the first horizontal line at which the effective display area begins, and a point on the first horizontal line at which the effective display area ends.

17. A method for driving a display device including a display unit having scan lines, data lines, first unit areas in an effective display area having a non-rectangular shape, and second unit areas in a dummy area around the effective display area, the method comprising:
   receiving first data including image data for all of the first and second unit areas;
   generating second data by reading effective data, the effective data being that first data corresponding to the first unit areas, and by replacing the remaining first data besides the effective data with predetermined data;
   generating, from the second data, line data corresponding to each horizontal line of the effective display area; and
   driving pixels on each horizontal line using the line data.

18. The method of claim 17, wherein the predetermined data is digital data corresponding to a predetermined first voltage.

19. The method of claim 18, wherein the first voltage is a lowest voltage from among gray level voltages of the display unit.

20. The method of claim 17, further comprising transmitting position information of the effective display area to a data driver.

* * * * *